United States Patent [19]

Hombach et al.

[11] Patent Number: 4,663,377

[45] Date of Patent: May 5, 1987

[54] POLYISOCYANATE PREPARATION DISPERSIBLE IN WATER AND THEIR USE AS AN ADDITIVE FOR AQUEOUS ADHESIVES

[75] Inventors: Rudolf Hombach; Helmut Reiff, both of Leverkusen; Manfred Dollhausen, Odenthal, all of Fed. Rep. of Germany

[73] Assignee: Bayer Aktiengesellschaft, Leverkusen, Fed. Rep. of Germany

[21] Appl. No.: 868,830

[22] Filed: May 29, 1986

[30] Foreign Application Priority Data

Jun. 15, 1985 [DE] Fed. Rep. of Germany ....... 3521618

[51] Int. Cl.$^4$ ............................................. C08L 75/08
[52] U.S. Cl. .................................... 524/196; 252/182; 524/197; 524/500; 524/560; 524/563; 524/565; 524/567; 524/571; 524/572; 524/575; 524/591; 528/904; 528/905
[58] Field of Search .............. 524/196, 197, 500, 560, 524/563, 565, 567, 571, 572, 575, 591; 252/182; 528/904, 905

[56] References Cited

U.S. PATENT DOCUMENTS

| 4,186,118 | 1/1980 | Reischl et al. | 524/591 |
| 4,413,112 | 11/1983 | Reiff et al. | 528/73 |
| 4,433,095 | 2/1984 | Hombach et al. | 524/563 |
| 4,528,117 | 7/1985 | Scholl et al. | 252/312 |
| 4,569,981 | 2/1986 | Wenzel et al. | 524/591 |

FOREIGN PATENT DOCUMENTS

| 2703271 | 8/1978 | Fed. Rep. of Germany . |
| 1523601 | 3/1976 | United Kingdom . |

*Primary Examiner*—Maurice J. Welsh
*Attorney, Agent, or Firm*—Gene Harsh; Joseph C. Gil; Thomas W. Roy

[57] ABSTRACT

The present invention is directed to a polyisocyanate preparation dispersible in water and having an average NCO functionality of about 2.0 to 3.5 which contains
(a) an aliphatic polyisocyanate or a mixture of aliphatic polyisocyanates; and
(b) a quantity of an emulsifier sufficient to ensure the dispersibility of the polyisocyanates.

The present invention is also directed to the use of this polyisocyanate preparation as an additive for aqueous adhesives based on polymers dispersed in water.

12 Claims, No Drawings

POLYISOCYANATE PREPARATION DISPERSIBLE IN WATER AND THEIR USE AS AN ADDITIVE FOR AQUEOUS ADHESIVES

BACKGROUND OF THE INVENTION

1. Field of the Invention

This invention relates to a polyisocyanate preparation dispersible in water based on an aliphatic polyisocyanate or a mixture of aliphatic polyisocyanates, as well as the use of this polyisocyanate preparation as an additive for aqueous adhesives based on polymers dispersible in water.

2. Description of the Prior Art

It is known to use polyisocyanates as additives for adhesives based on polymers dissolved in organic solvents. Thus, for example, polyfunctional polyisocyanates are added to solutions of natural or synthetic rubber or solutions of polyurethanes to achieve a more favorable adhesion on many materials to be bonded, a higher heat resistance of the bond and a better chemical resistance. According to the teachings of EP-A-0,061,628, the adhesive properties of aqueous polymers dispersible in water are improved by the addition of hydrophilically modified aromatic polyisocyanates.

This improvement is not sufficient, however, to achieve load B4 according to DIN 68,602 as required by the market. Wood bonds which are produced with polyvinylacetate adhesives according to the teaching of EP-A-0,061,628 can thus not be used indoors where there are extreme climatic fluctuations and the influence of water (indoor swimming pools, shower cubicles), nor can they be used outdoors due to vast climatic influences (for example windows, exterior doors, ladders, steps). These uses have only been possible by the addition of toxic producing chromium (III) salts; however, these salts lead to a sharp and undesirable drop in the viscosity of the adhesives. A further disadvantage of the adhesives modified according to the teaching of EP-A-0,061,628, for example those based on aqueous polyurethane dispersions, is the heat resistance of the resulting bonds at least about 75° C. (c.f. the comparative example below) which is too low for many practical applications. If such modified polyurethane dispersion adhesives are used, for example, with PVC film for laminating the wood fiber board in the production of automotive side parts, then this bond must withstand heat storage at at least 90° C. without stress.

It is thus the object of the present invention to provide new polyisocyanate preparations for use in aqueous adhesives which better fulfill the required adhesive properties and heat resistance of bonds than the present preparations.

This object can be achieved with the polyisocyanate preparations according to the invention based on aliphatic polyisocyanates and described in more detail below. With the polyisocyanate preparations according to the invention, it is possible, for example, to improve the conventional aqueous adhesives based on polyvinylacetate such that the resulting bonds correspond to load group B4 according to DIN 68 602 even without the simultaneous use of chromium (III) salts. Further, with the polyisocyanate preparations according to the invention, it is possible to improve aqueous adhesives based on polyurethane dispersions so that bonds produced therewith have the heat resistance required in practice at temperatures of about 90° C. This is surprising since previously only polyfunctional aromatic polyisocyanates have been added to the conventional solvent-containing adhesives based on natural and synthetic rubber or based on polyurethanes to improve the adhesive properties of the resulting bonds. A further advantage of the polyisocyanate preparations according to the invention is that the aqueous adhesives modified with the inventive preparations have a substantially longer pot life than corresponding adhesives containing the polyisocyanate preparations of the prior art based on aromatic polyisocyanates.

SUMMARY OF THE INVENTION

The present invention is directed to a polyisocyanate preparation dispersible in water and having an average NCO functionality of about 2.0 to 3.5 which contains (a) an aliphatic polyisocyanate or a mixture of aliphatic polyisocyanates: and (b) a quantity of an emulsifier sufficient to ensure the dispersibility of the polyisocyanates.

The present invention is also directed to the use of this polyisocyanate preparation as an additive for aqueous adhesives based on polymers dispersed in water.

DETAILED DESCRIPTION OF THE INVENTION

The polyisocyanate preparations to be used according to the invention have an (average) NCO functionality of about 2.0 to 3.5 and an NCO content of about 5 to 30%, preferably about 10 to 25%. Their dispersibility in water is ensured by a sufficient content of suitable emulsifiers.

The emulsifier-free polyisocyanate (a) is either an aliphatic polyisocyanate or a mixture of aliphatic polyisocyanates having an (average) NCO functionality of about 2.0 to 3.5 and an NCO content of about 5 to 30%, preferably about 10 to 25% by weight.

Suitable aliphatic polyisocyanates include: isocyanurate group-containing polyisocyanates based on aliphatic and/or cycloaliphatic diisocyanates. Particularly preferred are isocyanatoisocyanurates based on 1,6-diisocyanatohexane and/or 1-isocyanato-3,3,5-trimethyl-5-isocyanatomethyl-cyclohexane (isophorone diisocyanate=IPDI). The production of such isocyanurate group-containing polyisocyanates is described, for example, in DE-PS No. 2,616,416, EP-OS No. 3,765, EP-OS No. 10,589, EP-OS No. 47,452, US-PS No. 4,288,586 or US-PS No. 4,324,879. In addition to these particularly preferred compounds other isocyanurate group-containing polyisocyanates based on aliphatic and/or cycloaliphatic diisocyanates can be present as component (a). The isocyanato-isocyanurates suitable as component (a) are thus simple tris-isocyanatoalkyl- (or -cycloalkyl-)isocyanurates corresponding to the formula

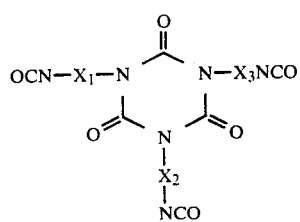

or mixtures thereof with their higher (more than one isocyanurate ring-containing) homologues, wherein $X_1$, $X_2$ and $X_3$ represent identical or different hydrocarbon radicals obtained by removing the isocyanate groups from the starting diisocyanate. The isocyanato-isocyanurates generally have an (average) NCO functionality of from 3 to 3.5 and an NCO content of about 5 to 30, preferably about 10 to 25% and most preferably about 15 to 25% by weight.

Additional aliphatic polyisocyanates include uretdione diisocyanates with aliphatically and/or cycloaliphatically bound isocyanate groups corresponding to the formula

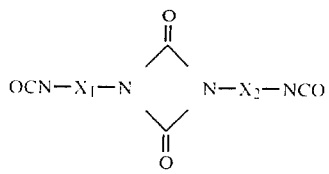

wherein $X_1$ and $X_2$ are as above and preferably represent the hydrocarbon radicals obtained by removing the isocyanate groups from hexamethylene diisocyanate and/or of IPDI.

The uretdione diisocyanates can be present in the preparations according to the invention as the sole component (a) or in admixture with other aliphatic polyisocyanates, particularly the isocyanurate group-containing polyisocyanates set forth under (1) above.

Further aliphatic polyisocyanates include 3. biuret group-containing polyisocyanates with aliphatically bound isocyanate groups, particularly tris-(6-isocyanatohexyl)-biuret or mixtures thereof with its higher homologues. These biuret group-containing polyisocyanates generally have a most preferred NCO content of about 18 to 22% by weight and an (average) NCO functionality of about 3 to 3.5.

Other suitable aliphatic polyisocyanates include 4. urethane and/or allophanate group-containing polyisocyanates with aliphatically or cycloaliphatically bound isocyanate groups obtained for example, by reacting excess quantities of hexamethylene diisocyanate or IPDI with simple polyhydric alcohols such as trimethylol propane, glycerine, 1,2-dihydroxy propane or mixtures thereof. These urethane and/or allophanate group-containing polyisocyanates suitable as component (a) according to the invention generally have a most preferred NCO content of about 12 to 20% by weight and an (average) NCO functionality of from 2.5 to 3.

Finally, aliphatic polyisocyanates also include 5. oxadiazinetrione group-containing polyisocyanates with aliphatically or cycloaliphatically bound isocyanate groups, particularly compounds corresponding to the formula:

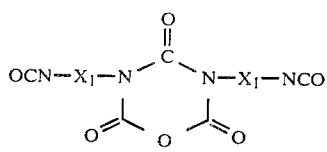

wherein $X_1$ has the meaning already given above and preferably represents a hexamethylene radical when the product has been produced from 1,6-diisocyanatohexane and carbon dioxide.

The aliphatic or cycloaliphatic polyisocyanates named by way of example at (1) to (5) above may also be present in mixtures as desired in the preparations according to the invention. Corresponding to the embodiments, the term "aliphatic polyisocyanates" according to the invention represents polyisocyanates wherein the isocyanate groups are bound to aliphatic or cycloaliphatic carbon atoms.

Suitable emulsifiers (b) are in particular reaction products of aliphatic polyisocyanates with nonionic ethylene oxide unit-containing polyether alcohols. Polyisocyanates suitable for the production of the emulsifiers include, in addition to the already above-mentioned polyisocyanates, other aliphatic diisocyanates. For the production of the suitable polyether alcohols, alkoxylation products of mono or polyvalent starter molecules are used such as methanol, n-butanol, cyclohexanol, 3-methyl-3-hydroxymethyloxetane, phenol, ethylene glycol, propylene glycol, aniline, trimethylol propane or glycerine, which contain at least 1 polyether chain containing at least 10, generally about 10 to 70, preferably about 15 to 60, ethylene oxide units. The polyether chains present in the emulsifiers generally have about 10 to 70, preferably about 15 to 60, alkylene oxide units and are either pure polyethylene oxide chains or mixed polyalkylene oxide chains wherein the alkylene oxide units comprise at least about 60% of ethylene oxide units with a minimum of at least 10 such units. The corresponding monohydric ether alcohols are particularly well suited for the production of the emulsifiers.

Suitable, but less preferred emulsifiers include the corresponding reaction products of aliphatic polyisocyanates with compounds which contain 1 to 3 isocyanate-reactive groups and in addition to these groups which are reactive with isocyanate groups, also contain built-in hydrophilic centers such as carboxylate, sulphonate, or ammonium groups.

The production of the emulsifiers takes place by reacting the aliphatic polyisocyanates with the hydrophilic compounds containing isocyanate-reactive groups, preferably with the named monofunctional, non-ionical hydrophilic polyether alcohols, in an NCO-/OH equivalent ratio of at least about 1:1, preferably about 2:1 to about 1000:1. In particular when using polyhydric polyether alcohols, an NCO/OH equivalent ratio of at least about 2:1 is employed. The emulsifiers can either be produced in a separate step by reaction of the named starting materials and then mixed with the polyisocyanate to be converted into an emulsifiable form, or they can be produced in situ. In this latter method the aliphatic polyisocyanate to be converted into an emulsifiable form is mixed with a quantity of polyether alcohol such that a polyisocyanate preparation according to the invention is produced in situ, i.e., it contains unmodified aliphatic polyisocyanate (component a) and also emulsifiers (component b). If the emulsifiers are produced in a separate step the above-mentioned starting materials are reacted at an NCO-/OH equivalent ratio of from about 2:1 to 6:1. If the emulsifiers are produced in situ, i.e. if the polyisocyanate preparations according to the inventions are produced in a one step process a higher excess of isocyanate groups within the above-mentioned range can be used. The quantity of the emulsifier which is mixed with the polyisocyanate to be converted into an emulsifiable form, or the quantity of polyether alcohols which is added to the polyisocyanate to be converted in situ into an emulsifiable form, is generally calculated such that the polyisocyanate preparation contains about 1 to 12% by weight, preferably about 3 to 8% by weight, of ethylene oxide units arranged in polyether chains. The production of the emulsifiers or the production of the polyisocyanate preparation generally takes place at a moderately elevated temperature of from about 50° to 130° C.

In order to reduce the viscosity of the polyisocyanate preparations, small quantities, i.e., about 1 to 10% by weight based on the solvent-free preparation, of an organic solvent such as ethylacetate, acetone or methylketone can be added to the preparations before they are used according to the invention. It is also possible to process the polyisocyanate preparations according to the invention in the form of aqueous dispersions with a solids content of about 10 to 65% by weight. The production of these dispersions and emulsions takes place shortly before the use according to the invention by mixing the polyisocyanate preparations with water.

The polyisocyanate preparations are particularly suitable for modifying aqueous adhesives having a solids content of about 10 to 65% by weight, preferably about 20 to 60% by weight, such as natural latex, aqueous dispersions of homo or copolymers of olefinically unsaturated monomers and the known aqueous polyurethane dispersions. These dispersions can naturally contain the auxiliaries and additives which are conventional in adhesive technology.

Suitable dispersions of homo or copolymers of olefinically unsaturated monomers include known dispersions of homo or copolymers based on vinyl esters of carboxylic acids having 2 to 18, preferably 2 to 4 carbon atoms such as vinyl acetate, optionally with up to about 70% by weight, based on the total quantity of olefinically unsaturated monomers, of other olefinically unsaturated monomers and/or homo or copolymers of (meth)acrylic acid esters of alcohols having from 1 to 18, preferably from 1 to 4, carbon atoms. Examples include (meth)acrylic acid or the methyl, ethyl, propyl, hydroxyethyl or hydroxypropyl esters thereof, optionally together with up to about 70% by weight of other olefinically unsaturated monomers: butadiene-styrene copolymers having a butadiene content of about 20 to 60% by weight; other diene-polymers or -copolymers such as polybutadiene or mixed polymers of butadiene with other olefinically unsaturated monomers such as styrene, acrylonitrile and/or methacrylonitrile; or aqueous dispersions of polymers or copolyners of 2-chlorobutadiene-1,3 having a chlorine content of from about 30 to 40% by weight, particularly a chlorine content of about 36% by weight, optionally with other olefinically unsaturated monomers of the type named above by way of example.

Suitable aqueous polyurethane dispersions are known and described, for example, in U.S. Pat. No. 3,479,310, GB Pat. No. 1,076,688, U.S. Pat. Nos. 4,108,814, 4,092,286, DE-OS No. 2,651,505, U.S. Pat. No. 4,190,566, DE-OS No. 2,732,131 or DE-OS No. 2,811,148.

The aqueous adhesives which are used according to the invention may contain the auxiliaries and additives which are conventional in adhesives technology. These include fillers such as quartz powder, quartz sand, finely dispersed silica, barite, calcium carbonate, chalk, dolomite or talc. These additives are often used together with suitable wetting agents including polyphosphates such as sodium hexamethaphosphate, naphthalene sulphonic acid, or ammonium or sodium polyacrylic acid salts, the wetting agent being generally used in quantities of about 0.2 to 0.6% by weight, based on the filler.

Further suitable auxiliaries include organic thickening agents in quantities of about 0.01 to 1% by weight, based on total adhesive, such as cellulose derivatives, alginates, starch, starch derivatives or polyacrylic acid; inorganic thickening agents such as bentonites in quantities of about 0.05 to 5% by weight, based on total adhesive.

Fungicides for preservation may also be added to the adhesives. These are generally used in quantities of about 0.02 to 1% by weight, based on total adhesive. Suitable fungicides include phenol and cresol derivatives, tin-organic compounds and other products known to those skilled in the art.

Tackifying resins including natural resins or modified resins such as colophonium esters or synthetic resins such as phthalate resins may also be added to the adhesive mixture.

Solvents such as toluene, xylene, butyl acetate, methylethyl ketone, ethyl acetate, dioxane or mixtures thereof; or plasticizers such as those based on adipate, phthalate or phosphate may also be added to the aqueous adhesive dispersions.

The polyisocyanate preparations according to the invention are added to the aqueous adhesives in quantities of about 1 to 20%, preferably about 2 to 10% by weight, based on the binding agent of the aqueous adhesive.

The aqueous dispersions thus modified are suitable for bonding selected materials of the same or different type, for example, bonding wood and paper, plastics materials, textiles, leather and inorganic materials such as ceramics, earthenware or asbestos cement.

The addition of the polyisocyanate preparations of the invention to the aqueous adhesives causes, in particular, an improvement in the heat resistance, water resistance and, when compared with the corresponding adhesives to which polyisocyanate preparations based on aromatic polyisocyanates have been added, the pot life.

The following examples serve to explain the invention in more detail. All percentages are percentages by weight.

EXAMPLES

Starting Products

Polyether 1

Monofunctional polyethylene oxide polyether with a molecular weight of 1145 started on n-butanol.

Polyether 2

Monofunctional polyethylene oxide polyether with a molecular weight of 1210 started on 3-ethyl-3-hydroxymethyl-oxedine.

Polyether 3

Monofunctional polyethylene oxide polypropylene oxide polyether with a molecular weight of 2150, started on n-butanol. Ethylene oxide content: 80%.

Polyether 4

Polyethylene oxide polyether with a molecular weight of 840 started on glycerine dimethyl ketal.

Polyisocyanate 1

An isocyanurate group-containing polyisocyanate produced by the trimerization of a portion of the isocyanate groups of 1,6-diisocyanatohexane containing tris-(6-isocyanatohexyl)-isocyanurate and the higher homologues thereof and having an NCO content of 21.6%, a content of monomeric diisocyanate of <0.3%, a viscosity at 23° C. of 1700 mPa.s and an average NCO functionality of about 3.3.

Polyisocyanate 2

A biuret-containing polyisocyanate based on 1,6-diisocyanatohexane containing N,N′,N″-tris-(6-isocyanatohexyl)-biuret and its higher homologues and having an NCO content of 21.0%, a content of monomeric 1,6-diisocyanatohexane of <0.5%, a viscosity at 23° C. of 8500 mPa.s and an average NCO functionality of about 3.3.

Polyisocyanate 3

A mixture of dimeric and trimeric 1,6-diisocyanatohexane, containing a mixture of bis-(6-isocyanatohexyl)-uretdione and tris-(6-isocyanatohexyl)-isocyanurate and having a viscosity at 23° C. of 150 mPa.s, an NCO content of 21.6% and an average NCO functionality of 2.6.

Polyisocyanate 4

Bis-(6-isocyanatohexyl)-oxadiazinetrione having an NCO content of 20.6% produced by reacting 1,6-diisocyanatohexane with carbon dioxide.

Polyisocyanate 5

An isocyanato-isocyanurate having an average NCO functionality of about 3.3 and obtained by the trimerization of IPDI which is present as a 70% solution in an aromatic hydrocarbon mixture, Solvesso ® 100, and which has an NCO content of the solution of 11%.

Polyisocyanate 6

Bis-(6-isocyanatohexyl)-uretdione having an NCO content of 21.5% and a viscosity at 23° C. of 80 mPa.s.

EXAMPLE 1

80.8 g of polyether 1 were heated to 50° C. and added to 1000 g of polyisocyanate 1 with stirring. Heating to 110° C. was carried out and this temperature was maintained for 2.5 h. After cooling, a clear, yellow resin dispersible in water was obtained which had an NCO content of 18.4%. Viscosity: 2500 mPa.s (23° C.)

EXAMPLE 2

40 g of polyether 2 were added to 500 g of polyisocyanate 1 with stirring and stirring was maintained for 2 h at 100° C. A clear, yellow, water-dispersible polyisocyanurate preparation was obtained which had an NCO content of 19.0% and a viscosity of 2600 mPa.s (23° C.).

EXAMPLE 3

Example 2 was repeated with 26.3 g of polyether 2 to obtain a polyisocyanurate having an NCO content of 19.7% and a viscosity of 3200 mPa.s (23° C.).

EXAMPLE 4

The procedure was as described in Example 2, except that 55.4 g of polyether 2 were used. A polyisocyanurate preparation according to the invention was obtained which had an NCO content of 18.1% and a viscosity of 1200 mPa.s (23° C.).

EXAMPLES 5 TO 14

The production of polyisocyanate preparations according to the invention took place analogously to Example 1. The starting materials and the properties of the resulting polyisocyanate preparations are set out in Table 1.

TABLE 1

| Example | Poly-isocyanate | Poly-ether | Polyether based on total weight (%) | NCO-content (%) actual | Viscosity (mPa · s) |
|---|---|---|---|---|---|
| 5 | 1 | 4 | 5 | 19.6 | 1600 (46° C.) |
| 6 | 2 + 3* | 2 | 10 | 19.3 | 1000 (23° C.) |
| 7 | 1 | 3 | 10 | 19.2 | 2900 (23° C.) |
| 8 | 4 | 3 | 10 | 18.6 | |
| 9 | 3 | 2 | 10 | 19.2 | 200 (23° C.) |
| 10 | 4 | 3 | 20 | 15.6 | 2200 (23° C.) |
| 11 | 2 | 2 | 5 | 19.5 | |
| 12 | 5 | 1 | 7.4 | 13.5 | 3900 (23° C.) |
| 13 | 6 | 3 | 5 | 18.7 | 200 (23° C.) |
| 14 | 3 | 1 | 7.5 | 19.5 | 220 (23° C.) |

*1:1-mixture of both polyisocyanates.

COMPARATIVE EXAMPLE ACCORDING TO THE TEACHING OF EP-A-0,061,628

In a 3 l stirring beaker with reflux cooler, 130 g of the compound of the formula

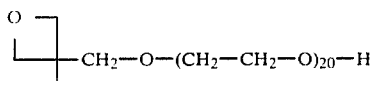

were added under nitrogen at 40° C. in a jet to 1870 g of a polyisocyanate mixture of the diphenylmethane series with a diisocyanato-diphenylmethane content of about 60% and a content of higher homologues of about 40%. After 15 minutes, the temperature of the reaction mixture was raised to 65° C. and kept at this temperature for 3 hours. After cooling to room temperature, a polyisocyanate preparation was present in the form of a clear, brown solution of the emulsifier, formed in situ, in excess polyisocyanate. The preparation had an NCO content of about 28%, an average NCO functionality of about 2.5 and a viscosity of 650 mPa.s (23° C.).

USE EXAMPLES 5 g of the polyisocyanate preparations according to Examples 1 to 10 and according to the Comparative Example were in each case mixed by hand in a glass beaker in 11 parallel experiments with, in each case, 100 g of a commercial aqueous dispersion of a vinyl acetate maleic acid n-butyl ester copolymer having a solids content of 53% (®Mowilith DHW of Hoechst AG, Germany). After mixing for 10 seconds, a homogeneous mixture was obtained in each case. The pot lives of the resulting aqueous adhesives are listed in Table 2.

In order to produce bonds using these aqueous adhesives, untreated beachwood test samples were coated with the adhesives. Within 15 minutes after applying the adhesives, two test samples were placed together so as to overlap over a surface of 2×1 cm² and were pressed together for 24 h under a pressure of 3.0 MPa. After storage for 7 days at room temperature, the transverse strength was determined. This took place in a tension testing machine with a spindle feed of 100 mm/min. The determined test values for the transverse strength are also listed in Table 2.

In a parallel series of experiments, corresponding bonds were produced for testing the resistance to boiling water according to load group B4 of DIN 68 602. The test samples were stored in boiling water for 6 hours after storage for 7 days in a normal climate. After subsequent storage for 2 hours in cold water, the transverse strength was determined in a wet condition with a spindle feed of 100 mm/min. The required value was at least 4 N/mm. This test data is also listed in Table 2.

In a further series of experiments, 5 g of the polyisocyanate preparations according to Examples 1 to 10 and according to the Comparative Example were in each case mixed by hand in a glass beaker in 11 parallel experiments with 100 g in each case of an anionic aqueous polyurethane dispersion having a solids content of 40%, a content of carboxylate groups of 2,4 milliequivalents per 100 g of solids and a content of sulfonate groups of 20 milliequivalents per 100 g of solids and which has been prepared from hexamethylene diisocyanate, a polyesterdiol having a molecular weight of 2000 based on adipic acid and 1,4-dihydroxybutane, the sodium salt of N-(aminoethyl)-aminoethane sulfonic acid and sodium salt of dimethylol propionic acid. After about 10 seconds, a homogeneous mixture of the components was present in each case.

With these mixtures, bonds were produced in each case according to ASTM 816 D. A 4 mm thick PVC material with a content of 30% of dioctyl phthalate as plasticizer served as the material to be bonded.

Before applying the adhesives, the surfaces to be bonded were thoroughly roughened with an abrasive strip having a granulation of 40. The materials were freed from abrasive dust and provided with an adhesive layer about 0.1 mm thick. After an airing time of 30 min, the adhesive surfaces were brought to a temperature of from 80° to 85° C. within 3 sec by radiation heat. The adhesive strips were thereafter placed together so that they overlap over an area of 2.5×2.5 cm. The test samples are pressed for 10 sec with a pressure of 0.4 MPa.

For determining the resistance to heat according to ASTM 816 D, the test samples stored in each case for 9 days at room temperature were subjected to a shearing test. The test samples were hereby loaded with a mass of 11 kg. After annealing for 20 minutes at 40° C., the temperature at which the bond fails was determined by raising the temperature by 0.25° C. per minute. The temperatures achieved are set forth in Table 2.

1. A polyisocyanate composition which is dispersible in water, has an average NCO functionality of about 2.0 to 3.5 and comprises
   (a) at least one aliphatic polyisocyanate and
   (b) a quantity of emulsifier which is sufficient to render component (a) dispersible in water.

2. The polyisocyanate composition of claim 1 wherein component (b) comprises the reaction product of an aliphatic polyisocyanate with a mono- or polyhydric, nonionic polyalkylene ether alcohol having at least one polyether chain containing at least 10 ethylene oxide units.

3. The polyisocyanate composition of claim 1 wherein component (a) comprises an isocyanurate group-containing polyisocyanate based on 1,6-diisocyanatohexane and/or 1-isocyanato-3,3,5-trimethyl-5-isocyanatomethyl-cyclohexane, a uretdione group-containing diisocyanate based on 1,6-diisocyanatohexane and/or 1-isocyanato-3,3,5-trimethyl-5-isocyanatomethyl-cyclohexane, a urethane group-containing polyisocyanate based on 1,6-diisocyanatohexane and/or 1-isocyanato-3,3,5-trimethyl-5-isocyanatomethyl-cyclohexane, an allophonate group-containing polyisocyanate based on 1,6-diisocyanatohexane and/or 1-isocyanato-3,3,5-trimethyl-5-isocyanatomethyl-cyclohexane, a biuret group-containing polyisocyanate based on 1,6-diisocyanatohexane, bis-(6-isocyanatohexyl)-oxadiazinetrione and mixtures of these polyisocyanates.

4. The polyisocyanate composition of claim 2 wherein component (a) comprises an isocyanurate group-containing polyisocyanate based on 1,6-diisocyanatohexane and/or 1-isocyanato-3,3,5-trimethyl-5-isocyanatomethyl-cyclohexane, a uretdione group-containing diisocyanate based on 1,6-diisocyanatohexane and/or 1-isocyanato-3,3,5-trimethyl-5-isocyanatomethyl-cyclohexane, a urethane group-containing polyisocyanate based on 1,6-diisocyanatohexane and/or 1-isocyanato-3,3,5-trimethyl-5-isocyanatomethyl-cyclohexane, an allophonate group-containing polyisocyanate based on 1,6-diisocyanatohexane and/or

TABLE 2

| Polyisocyanate preparation according to Example | PU-dispersion resistance to heat according to ASTM 816 D | Iranverse strength according to DIN 68602 at room temperature N/mm | PVA dispersion ance to boiling water according to DIN 68602 B4 N/mm | Pot life |
| --- | --- | --- | --- | --- |
| 1 | 89° | 14.5 | 4.6 | >8 h |
| 2 | 92° | 15.5 | 5.2 | >8 h |
| 3 | 94° | 14.2 | 5.6 | >8 h |
| 4 | 87° | 13.8 | 5.0 | >8 h |
| 5 | 92° | 14.8 | 4.3 | >8 h |
| 6 | 87° | 15.2 | 5.1 | >8 h |
| 7 | 89° | 14.0 | 5.6 | >8 h |
| 8 | 93° | 14.1 | 4.4 | >8 h |
| 9 | 97° | 14.2 | 5.2 | >8 h |
| 10 | 91° | 14.8 | 4.6 | >8 h |
| Comparative Example | 75° | — | 1.1 | 3 h |
| without | 62° | — | 0 | — |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1-isocyanato-3,3,5-trimethyl-5-isocyanatomethyl-cyclohexane, a biuret group-containing polyisocyanate based on 1,6-diisocyanatohexane, bis-(6-isocyanatohexyl)-oxadiazinetrione and mixtures of these polyisocyanates.

5. A composition which comprises
   (1) an aqueous adhesive based on a polymer dispersed in water and
   (2) the polyisocyanate composition of claim 1.

6. The composition of claim 5 wherein component (2) is present in a quantity of about 1 to 20% by weight, based on the binder of component (1).

7. The composition of claim 5 wherein component (1) has a solids content of about 10 to 65% by weight and comprises natural latex, an aqueous dispersion of a homo- or copolymer of at least one olefinically unsaturated monomer or an aqueous polyurethane dispersion.

8. The composition of claim 6 wherein component (1) has a solids content of about 10 to 65% by weight and comprises natural latex, an aqueous dispersion of a homo- or copolymer of at least one olefinically unsaturated monomer or an aqueous polyurethane dispersion.

9. The composition of claim 5 wherein component (b) comprises the reaction product of an aliphatic polyisocyanate with a mono- or polyhydric, nonionic polyalkylene ether alcohol having at least one polyether chain containing at least 10 ethylene oxide units.

10. The composition of claim 5 wherein component (a) comprises an isocyanurate group-containing polyisocyanate based on 1,6-diisocyanatohexane and/or 1-isocyanato-3,3,5-trimethyl-5-isocyanatomethyl-cyclohexane, a uretdione group-containing diisocyanate based on 1,6-diisocyanatohexane and/or 1-isocyanato-3,3,5-trimethyl-5-isocyanatomethyl-cyclohexane, a urethane group-containing polyisocyanate based on 1,6-diisocyanatohexane and/or 1-isocyanato-3,3,5-trimethyl-5-isocyanatomethyl-cyclohexane, an allophanate group-containing polyisocyanate based on 1,6-diisocyanatohexane and/or 1-isocyanato-3,3,5-trimethyl-5-isocyanatomethyl-cyclohexane, a biuret group-containing polyisocyanate based on 1,6-diisocyanatohexane, bis-(6-isocyanatohexyl)-oxidiazinetrione and mixtures of these polyisocyanates.

11. The composition of claim 6 wherein component (a) comprises an isocyanurate group-containing polyisocyanate based on 1,6-diisocyanatohexane and/or 1-isocyanato-3,3,5-trimethyl-5-isocyanatomethyl-cyclohexane, a uretdione group-containing diisocyanate based on 1,6-diisocyanatohexane and/or 1-isocyanato-3,3,5-trimethyl-5-isocyanatomethyl-cyclohexane, a urethane group-containing polyisocyanate based on 1,6-diisocyanatohexane and/or 1-isocyanato-3,3,5-trimethyl-5-isocyanatomethyl-cyclohexane, an allophanate group-containing polyisocyanate based on 1,6-diisocyanatohexane and/or 1-isocyanato-3,3,5-trimethyl-5-isocyanatomethyl-cyclohexane, a biuret group-containing polyisocyanate based on 1,6-diisocyanatohexane, bis-(6-isocyanatohexyl)-oxadiazinetrione and mixtures of these polyisocyanates.

12. The composition of claim 11 wherein component (1) has a solids content of about 10 to 65% by weight and comprises natural latex, an aqueous dispersion of a homo- or copolymer of at least one olefinically unsaturated monomer or an aqueous polyurethane dispersion.

* * * * *